US009032127B2

(12) United States Patent
Fischer et al.

(10) Patent No.: US 9,032,127 B2
(45) Date of Patent: May 12, 2015

(54) METHOD OF BALANCING I/O DEVICE INTERRUPT SERVICE LOADING IN A COMPUTER SYSTEM

(75) Inventors: Matthew L. Fischer, Fort Collins, CO (US); Francis J. Ginther, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2179 days.

(21) Appl. No.: 11/520,910

(22) Filed: Sep. 14, 2006

(65) Prior Publication Data

US 2008/0071947 A1     Mar. 20, 2008

(51) Int. Cl.
*G06F 3/00* (2006.01)
*G06F 13/24* (2006.01)
*G06F 13/00* (2006.01)

(52) U.S. Cl.
CPC ...................... *G06F 13/24* (2013.01)

(58) Field of Classification Search
USPC ......................... 710/265, 305, 260
See application file for complete search history.

(56) References Cited

U.S. PATENT DOCUMENTS

| | | | | |
|---|---|---|---|---|
| 3,858,182 A * | 12/1974 | Delagi et al. | ...................... | 726/16 |
| 4,654,820 A * | 3/1987 | Brahm et al. | ................... | 710/260 |
| 4,930,065 A * | 5/1990 | McLagan et al. | ................ | 710/50 |
| 5,471,618 A * | 11/1995 | Isfeld | .............................. | 710/19 |
| 5,603,035 A | 2/1997 | Erramoun et al. | | |
| 6,115,778 A * | 9/2000 | Miyake et al. | ................. | 710/260 |
| 6,145,048 A * | 11/2000 | Klein | ............................ | 710/264 |
| 6,237,058 B1 * | 5/2001 | Nakagawa | ..................... | 710/260 |
| 6,304,911 B1 * | 10/2001 | Brcich et al. | ................... | 709/237 |
| 6,356,998 B2 * | 3/2002 | Roche | ............................ | 712/244 |
| 6,618,780 B1 * | 9/2003 | Popat | ........................... | 710/264 |
| 6,633,940 B1 * | 10/2003 | Alasti et al. | ................... | 710/262 |
| 6,711,643 B2 * | 3/2004 | Park et al. | ..................... | 710/260 |
| 6,807,595 B2 * | 10/2004 | Khan et al. | .................... | 710/260 |
| 6,813,665 B2 * | 11/2004 | Rankin et al. | ................... | 710/260 |
| 6,877,057 B2 * | 4/2005 | Alexander et al. | ............ | 710/263 |
| 6,917,997 B2 * | 7/2005 | Bhagat | .......................... | 710/261 |
| 6,952,749 B2 * | 10/2005 | Kim | .............................. | 710/260 |
| 7,058,743 B2 * | 6/2006 | Ostrovsky et al. | ............ | 710/260 |
| 7,086,057 B2 * | 8/2006 | Hayashi | ........................ | 718/102 |
| 7,149,831 B2 | 12/2006 | Ruemmler et al. | | |
| 7,165,134 B1 * | 1/2007 | Kardach | ....................... | 710/264 |
| 7,386,646 B2 * | 6/2008 | So et al. | ........................ | 710/260 |

(Continued)

OTHER PUBLICATIONS

Jian Yang et al , A linux Kernel with fixed Interrupt Latency for Embedded Real-Time System, 2005, Proceedings of the Second International Conference of Embedded Software and Systems.*

(Continued)

*Primary Examiner* — Tim T Vo
*Assistant Examiner* — Christopher A Daley
(74) *Attorney, Agent, or Firm* — Calfee, Halter & Griswold LLP

(57) ABSTRACT

A method of balancing input/output (I/O) device interrupt service loading in a computer system comprises: assigning priorities to a plurality of I/O device interrupts of a processing unit of the computer system; servicing the plurality of interrupts according to the assigned priorities thereof; collecting data on the interrupt servicing of the plurality of interrupts over a time interval; reassigning the priorities of the plurality of interrupts based on the collected interrupt service data; and repeating the collecting and reassigning steps to balance input/output (I/O) device interrupt service loading of the processing unit.

19 Claims, 7 Drawing Sheets

(56) References Cited

U.S. PATENT DOCUMENTS

| | | | |
|---|---|---|---|
| 7,424,563 B2* | 9/2008 | Birenbach et al. | 710/261 |
| 7,444,450 B2* | 10/2008 | Wright et al. | 710/264 |
| 7,444,639 B2* | 10/2008 | Jahnke | 718/105 |
| 7,484,024 B2* | 1/2009 | Kwon et al. | 710/264 |
| 7,546,406 B2* | 6/2009 | Armstrong et al. | 710/267 |
| 7,610,425 B2* | 10/2009 | Solomita et al. | 710/260 |
| 2002/0144099 A1* | 10/2002 | Muro et al. | 712/228 |
| 2003/0145147 A1* | 7/2003 | Alexander et al. | 710/260 |
| 2003/0200250 A1* | 10/2003 | Kiick | 709/102 |
| 2003/0204655 A1* | 10/2003 | Schmisseur et al. | 710/260 |
| 2004/0177192 A1* | 9/2004 | Pezzini | 710/260 |
| 2005/0060460 A1* | 3/2005 | Karamatas et al. | 710/260 |
| 2006/0112208 A1* | 5/2006 | Accapadi et al. | 710/265 |
| 2006/0179196 A1* | 8/2006 | Gray | 710/240 |
| 2006/0218328 A1* | 9/2006 | Vega et al. | 710/260 |
| 2006/0236002 A1* | 10/2006 | Valenci | 710/48 |
| 2007/0016710 A1* | 1/2007 | Kimelman et al. | 710/264 |
| 2007/0043970 A1* | 2/2007 | Solomita et al. | 714/10 |
| 2007/0186022 A1* | 8/2007 | Ren et al. | 710/260 |

OTHER PUBLICATIONS

U.S. Patent No. 7,149,831, Non-Final Office Action mailed May 22, 2006.

U.S. Patent No. 7,149,831, Notice of Allowance mailed Jan. 18, 2007.

* cited by examiner

METHOD OF BALANCING I/O DEVICE INTERRUPT SERVICE LOADING IN A COMPUTER SYSTEM

RELATED CO-PENDING PATENT APPLICATION

U.S. patent application Ser. No. 10/950,994, entitled "Batch Processing of Interrupts", now U.S. Pat. No. 7,149,831, filed by Ruemmler et al. and assigned to the same assignee as the instant application, which application is incorporated herein by reference in its entirety.

BACKGROUND

Multi-processor systems, like servers, for example, service a variety of input/output (IO) devices generally over a system bus. These IO devices use interrupts, for the most part, to signal the system that they have data for processing thereby. Typically, the system identifies the IO devices connected thereto and assigns each IO device interrupt a priority number and processing unit which may be performed arbitrarily. Each processing unit of the system will service the interrupts assigned thereto using its interrupt architecture and operating system interrupt handler according to the assigned priority numbers thereof.

Current interrupt allocation and assignment for the multi-processor systems has been Wound to be inherently unfair. Typically, interrupt vectors, which are used to prioritize interrupt handling of the IO devices, are assigned according to a first come, first serve basis. This means that the first IO devices identified in the system are assigned the lowest interrupt priority vectors in their service priority level (SPL) class. Accordingly, if a processing unit of the system has many busy IO devices assigned to it, interrupt processing by the unit of one IO device interrupt may delay processing of interrupts of the other assigned IO devices which may lead to some IO device interrupts "hogging" the resources of the processing unit.

For example, in the Intel® Itanium® Processor Family, each processor unit provides the highest pending interrupt, one at a time. This may lead to IO devices, which may have lower priority vectors, waiting for long periods of time for their associated interrupts to be serviced causing IO device resets and timeouts, for example. One solution is offered in the above-referenced co-pending patent application Ser. No. 10/950,994, now U.S. Pat. No. 7,149,831. In this solution, a batch of pending interrupts are read into a working list and serviced in an interrupt priority order. During batch processing, incoming interrupt vectors having the same or lower priority levels than those on the list will not be serviced. However, if an interrupt having a priority level higher than the interrupts in the working list is received during batch processing, it will be serviced preemptively. So, the solution offers a fairness to interrupts in the working list over incoming interrupts having the same or lower priority level.

SUMMARY

In accordance with one aspect of the present invention, a method of balancing input/output (I/O) device interrupt service loading in a computer system comprises: assigning priorities to a plurality of I/O device interrupts of a processing unit of the computer system; servicing the plurality of interrupts according to the assigned priorities thereof; collecting data on the interrupt servicing of the plurality of interrupts over a time interval; reassigning the priorities of the plurality of interrupts based on the collected interrupt service data; and repeating the collecting and reassigning steps to balance input/output (I/O) device interrupt service loading of the processing unit.

DETAILED DESCRIPTION OF THE INVENTION

Figure 1:
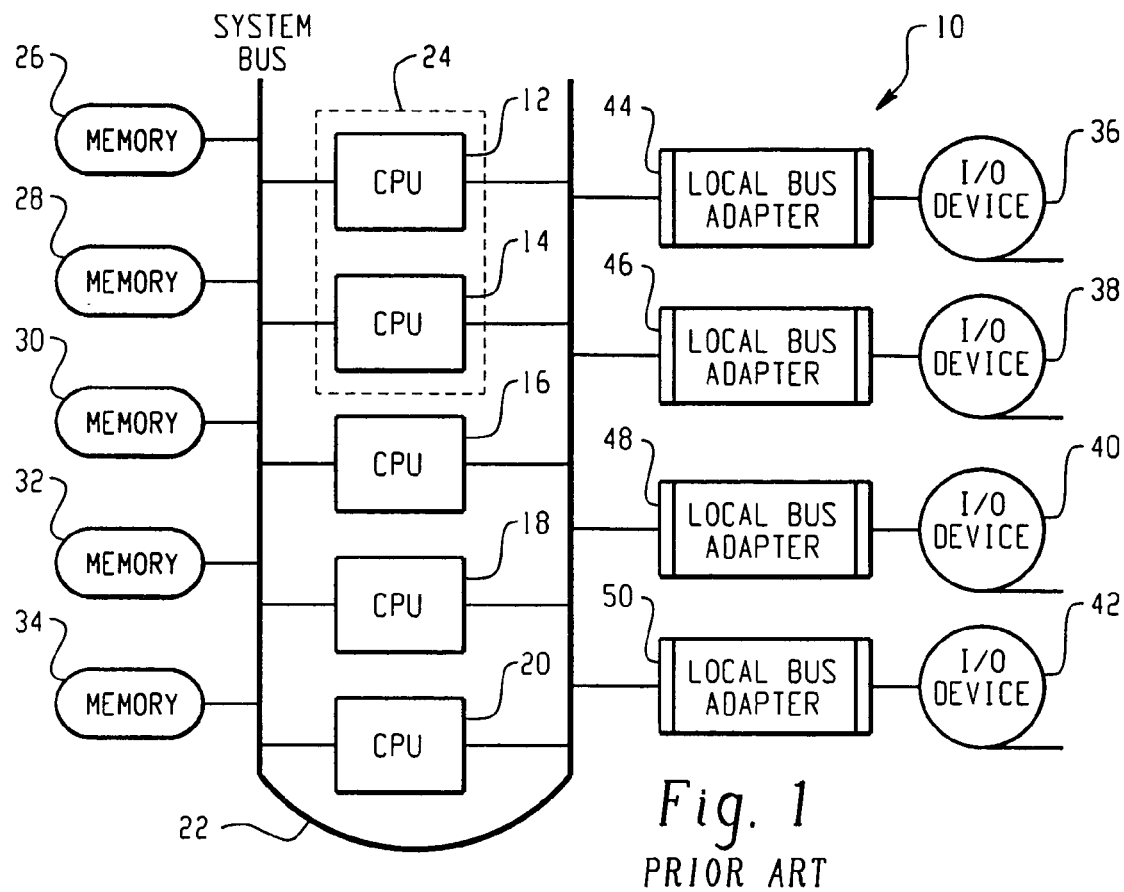
FIG. 1 is a block diagram schematic of an exemplary multi-processor system.

FIG. 1 is a block diagram schematic of an exemplary multi-processor system 10, like a server, for example, suitable for embodying at least one aspect of the present invention. The processing core of the system 10 comprises a plurality of central processing units (CPUs) 12, 14, 16, 18 and 20 which are all interconnected to a system bus 22. Some of the CPUs, like 12 and 14, for example, may be embodied in a common integrated circuit illustrated within the dashed lines 24. Also included in the system 10 may be a plurality of memory units 26, 28, 30, 32 and 34 which may be dual in-line memory modules (DIMMs), for example. The memory units 26, 28, 30, 32 and 34 may be coupled to the system bus 22 for communicating with the plurality of CPUs thereover. Further included in the system 10 is a plurality of input/output (I/O) devices 36, 38, 40 and 42 which may be hard drives, network cards, video cards, and the like, which are coupled to the CPUs through the system bus 22.

As noted herein above, the plurality of PO devices 36, 38, 40 and 42 are serviced by the CPUs of the system 10 in accordance with an interrupt priority mechanism or technique as will become more evident from the description below. In order to render each I/O device of the plurality compatible with the operations of the system CPUs and bus, a local bus adapter may be coupled between each I/O device and the system bus 22. For example, local bus adapters 44, 46, 48 and 50 couple I/O devices 36, 38, 40 and 42, respectively, to the system bus 22. The adapters 44, 46, 48 and 50 may perform the buffering and timing functions for exchanging data and control signals over the system bus 22 in accordance with the communication protocol thereof.

Figure 2:
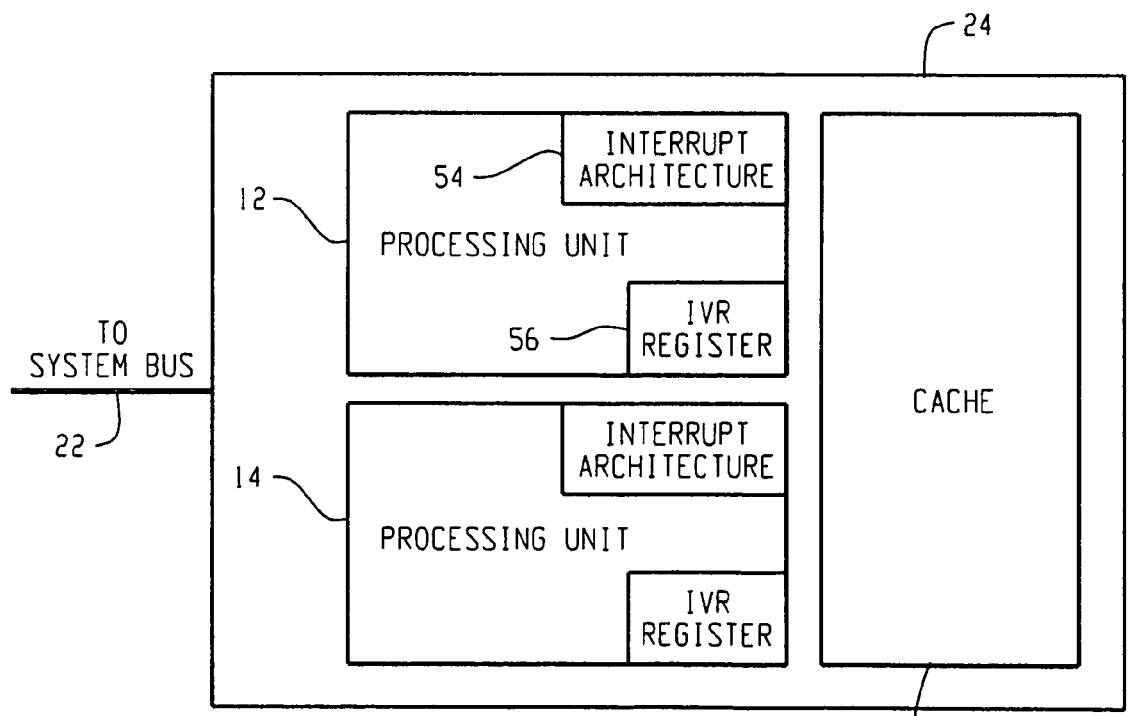
FIG. 2 is a block diagram schematic of an exemplary multiple CPU integrated circuit suitable for use in the embodiment of FIG. 1.

An example of a multiple CPU integrated circuit 24 suitable for use in the present embodiment is the Intel Itanium or Itanium 2 Processor Family which is shown in the block diagram schematic of FIG. 2. Referring to FIG. 2, an Itanium or Itanium 2 processor integrated circuit or chip may include two or more processing units 12 and 14 and a cache memory 52. Each of the processing units 12 and 14 include an interrupt architecture 54 comprising an interrupt vector register (IVR) for processing the interrupts from the I/O devices assigned to it via the system bus 22. In addition, each processor 12 and 14 may perform its operational tasks under executive control of an operating system (OS), like the HP-UX® operating system, for example, and associated platform firmware. The operating system of the processor typically includes an interrupt handler which is executed by the processor to perform interrupt allocation, assignment and processing tasks in conjunction with the interrupt architecture of the processor. While the HP-UX operating system is preferred for the present embodiment, other operating systems, like Windows® and Linux® may be used just as well.

In the Itanium Processor Family, the interrupt allocation and assignment is performed automatically by the OS interrupt handler. In the present embodiment, interrupt vector numbers, which are used to prioritize interrupt servicing and handling, are assigned by a first come, first serve basis. That is, the first I/O devices identified in the system may be assigned the lowest interrupt vector numbers. For the HP-UX implementation that runs on the Itanium Processor Family, the interrupt vector numbers may range from 96 to 191, for example, and may be grouped into five (5) priority levels with a predetermined number of vector numbers in each priority level grouping. In this scheme, for example, the highest priority level grouping 5 may include the highest vector numbers, like 173-191, and the lowest priority level grouping 1 may include the lowest vector numbers, like 91-114.

Figure 3:
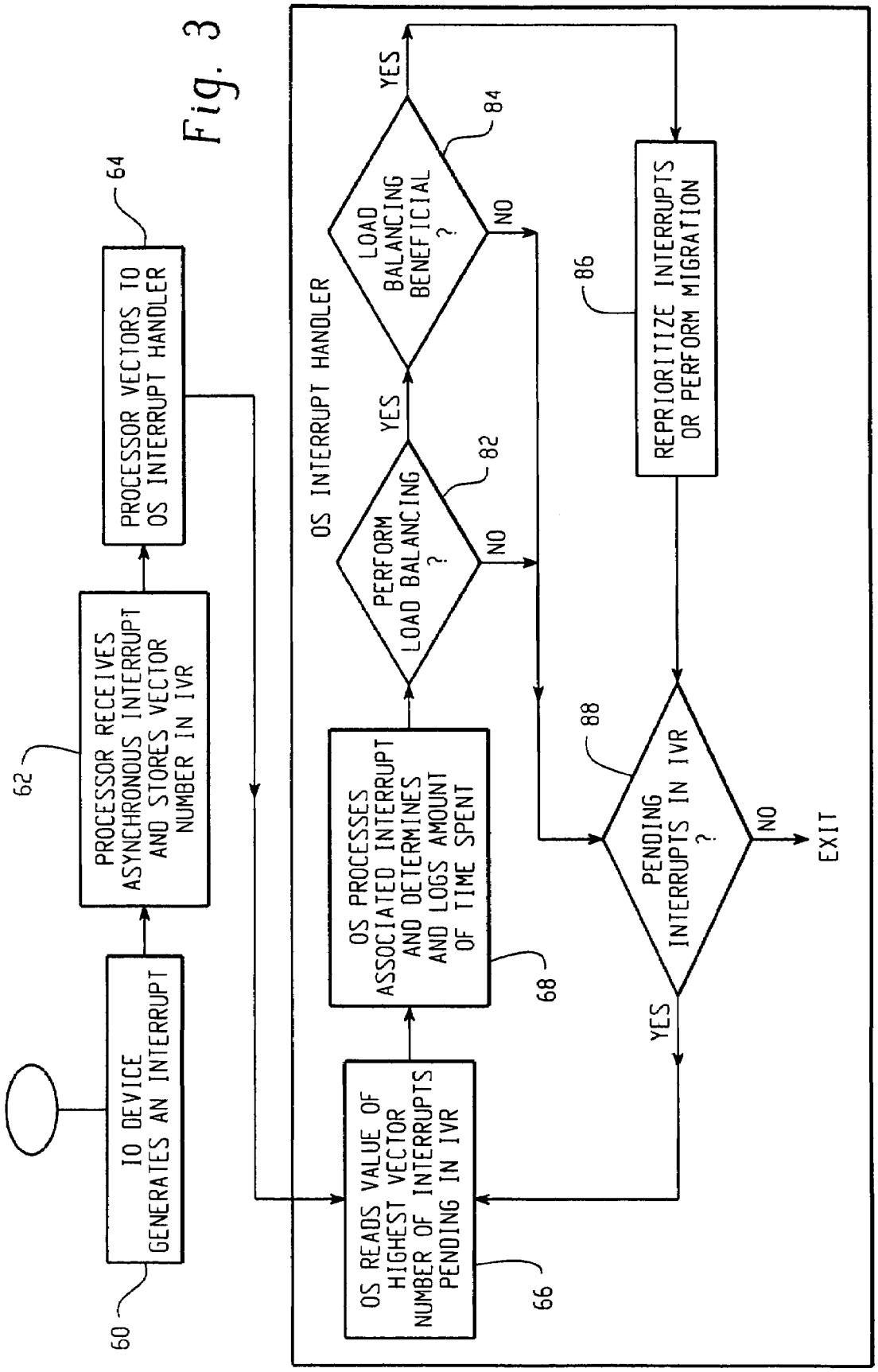
FIG. 3 is a flowchart exemplifying steps of an interrupt processing method for the processing units of a processor unit.

The flowchart of FIG. 3 exemplifies the steps of interrupt processing of each processing unit of the system 10 in accordance with the present embodiment. Each block in the flowchart may represent one or more steps in the interrupt processing method. Referring to FIGS. 1-3, as an I/O device of system 10 generates an asynchronous interrupt as exemplified by block 60, the assigned processor unit of the system 10 receives the generated interrupt via the system bus 22 and the interrupt architecture 54 thereof automatically stores the vector number thereof in the IVR register 56 by block 62. As noted above, the ISR 56 stores the vector numbers of the pending or unserviced interrupts of the assigned I/O devices. Thereafter, the processor unit vectors to the OS interrupt handler thereof in block 64 for servicing the pending interrupts recorded in the IVR register 56 in accordance with the present embodiment.

Figure 4:
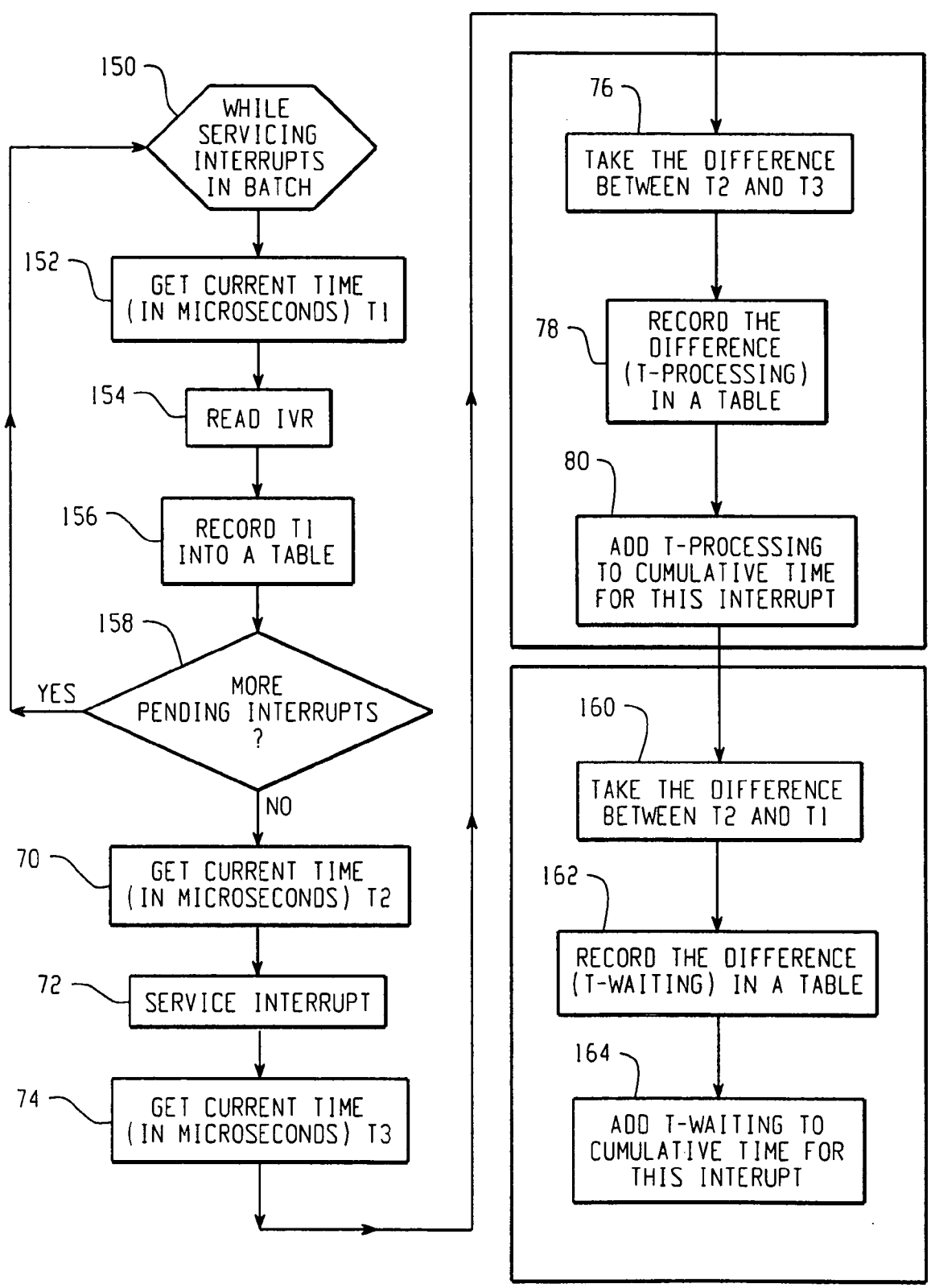
FIG. 4 is a flowchart exemplifying steps for determining interrupt waiting and processing times.

In block 66, the OS interrupt handler reads the value of the highest vector number of the interrupts pending in the IVR register and in block 68, processes the associated interrupt with an interrupt service routine, and determines and logs the amount of time spent in servicing the interrupt in a software implemented table. An exemplary flowchart of computer implemented steps for determining and logging interrupt processing time of the interrupt currently being processed in block 68 in accordance with the present embodiment is shown in FIG. 4. The flowchart of FIG. 4 includes steps of determining both interrupt waiting times and processing times. For the present embodiment, only processing time for servicing the current interrupt will be determined. The steps for determining the waiting times of interrupts may be used in connection with an alternate embodiment described herein below.

Referring to FIG. 4, in block 70, the current time T2, which may be in microseconds, is stored when the service routine for processing the current interrupt is called. In the present embodiment, a time clock may be kept by the operating system and made accessible to the instant time determination routine. Accordingly, T2 may be time in microseconds accessed from such a time clock, for example. Next, in block 72, the current interrupt is serviced by the service routine. Then, after interrupt servicing, a second time T3 is accessed from the time clock in block 74. In block 76, a time difference T3−T2 is determined as being representative of the individual processing time of the current interrupt. In block 78, this time difference is logged or recorded in the table under the vector number associated with the current interrupt. Then, in block 80, the present individual processing time is added together with past individual processing times to render a cumulative processing time for the current interrupt which is also logged into the table under the associated vector number.

Returning to FIG. 3, after performing the steps of block 68 (see FIG. 4), the individual and cumulative processing times of the current interrupt are logged into the table for use in determining individual interrupt loading on the processor as will become more evident from the following description. In the present embodiment, every so often the OS interrupt handler may check the cumulative processing time of each assigned interrupt to determine whether or not one or more higher priority interrupts are monopolizing the interrupt handler and preventing lower priority interrupts from being handled. In order to ensure that the lower priority interrupts are handled, the OS interrupt handler may use the cumulative processing times of the interrupts to rebalance the interrupt priorities.

This load balancing determination may be performed in the present embodiment periodically, like every fifteen (15) minutes, for example, or every so often. An interim time value may be also set by a system administrator. The interim time periods between load balancing determinations will permit an ample accumulation of processing times for the interrupts in order to render a proper interrupt load balancing determination. In addition, performing the load balancing determination only so often will reduce the processing load on the processing unit itself. In block 82, the OS interrupt handler may use a software implemented time clock, which may be reset to zero after each load balancing determination and permitted to count up, to determine when to perform the next interrupt load balancing determination. That is, when the time clock is determined to be at the predetermined time, the decisional block 82 directs execution to block 84 and resets the time clock to zero. During the time that the time clock Counts up to the predetermined time, block 84 is by-passed by block 82.

Figure 5:
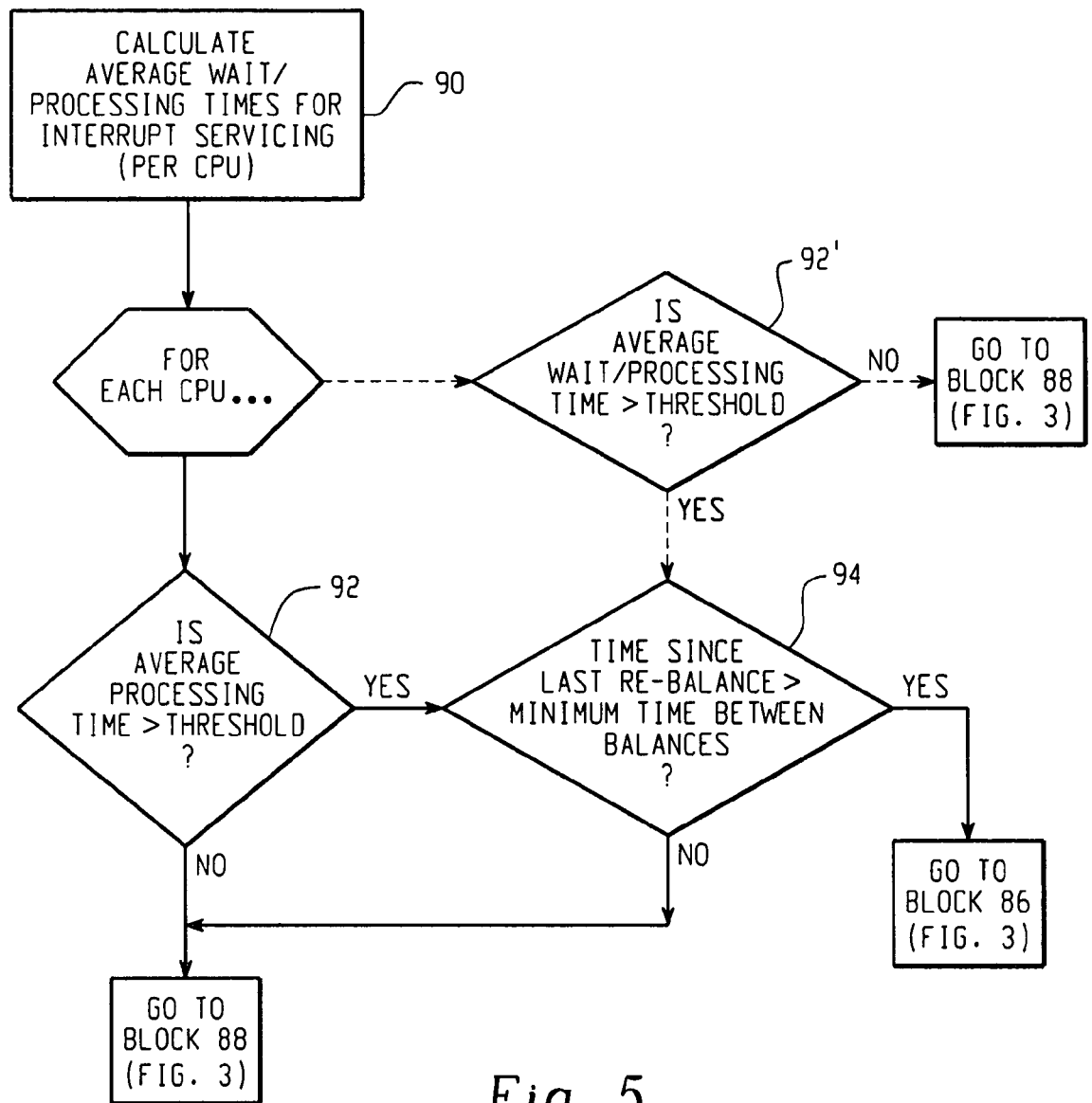
FIG. 5 is a flowchart exemplifying steps for determining whether or not load balancing is beneficial.

Decisional block 84 determines if a load balancing is beneficial. A suitable routine for this determination is found in the flowchart of FIG. 5. Referring to FIG. 5, in block 90, the average processing time for interrupt servicing is calculated in each CPU of the system. In an alternate embodiment, one of the CPUs of the system may be deemed a master CPU and perform the calculations for all of the CPUs for rendering the determination of load balancing. In either embodiment, the average processing time for each CPU may be calculated by adding up all of the cumulative processing times stored in the table to yield a total processing time for the CPU which is divided by the number of interrupt vectors assigned to the CPU.

Once the average processing time for each CPU is determined, then for each CPU, the average processing time is compared to a predetermined threshold in block 92. In general, the performance of block 86 may be based on the average processing time. In the present embodiment, if the average processing time does not exceed the threshold, block 86 is by-passed and execution is directed to block 88 in the routine of FIG. 3. Otherwise, load balancing is considered beneficial and execution is directed to block 94 in the routine of FIG. 5 wherein it is determined if the time since the last re-balance has exceeded a predetermined minimum time between balances. If so, execution is directed to block 86 of the routine of FIG. 3. Otherwise, execution is directed to block 88. It is understood that in another embodiment, the decision of the comparison of block 92 may be reversed. That is, block 86 is performed if the average processing time is less than the threshold.

Figure 6:
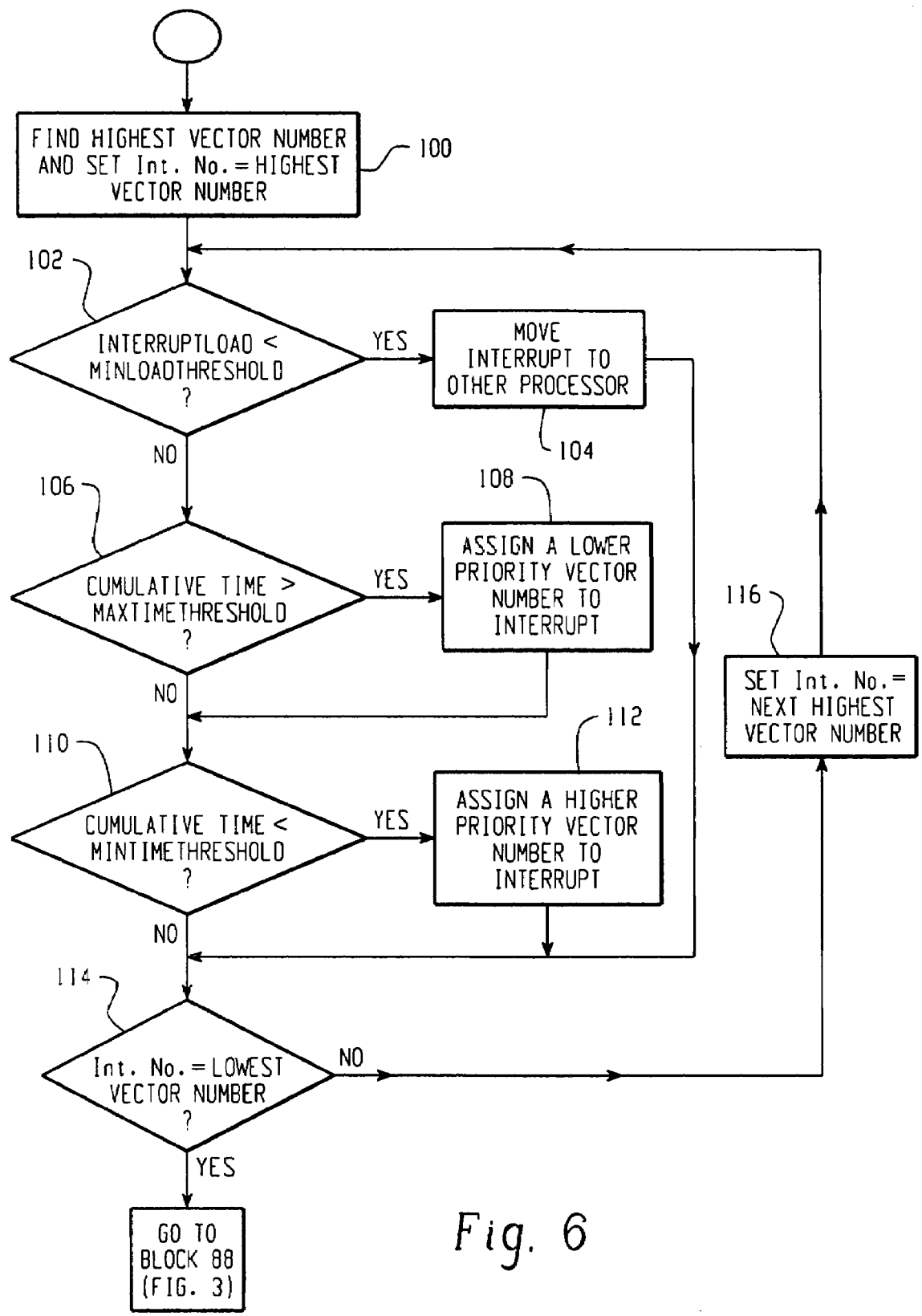
FIG. 6 is a flowchart exemplifying steps for performing interrupt service load balancing.

In block 86 of the exemplary routine of FIG. 3, the assigned interrupts of the CPU are either reprioritized or migrated (reassigned) to a different CPU for processing. A suitable routine for performing this task for the present embodiment is exemplified in FIG. 6. Referring to FIG. 6, in block 100, the highest vector number of the assigned interrupts is found and an interrupt number (IntNo.) is set equal to it. Next, in block 102, each of the other CPUs of the system is evaluated for interrupt loading by comparing the Interruptload of each, which may be the total processing time spent on servicing the interrupts thereof, with a predetermined minimum load threshold (Minloadthreshold). If the interrupt loading of a CPU (target CPU) is determined to be less than the minimum threshold in block 102, then the interrupt associated with IntNo. is moved (reassigned) to the other or target CPU of the system for processing in block 104. This may be accomplished in the present embodiment by communication between the OS interrupt handlers of the corresponding CPUs and the vector number of IntNo. may be stored in the IVR of the other CPU for processing thereby. In this manner, a CPU of the system may migrate interrupts to another CPU of the system to off-load interrupt processing time thereof.

If the Interruptloads of the other CPUs of the system all exceed their respective minimum load thresholds, then the routine goes through an interrupt priority reassignment of the interrupts assigned thereto starting at block 106. In block 106, the cumulative processing time of IntNo., which may be accessed from the table noted above, is compared with a predetermined maximum time threshold (maxtimethreshold). If the cumulative processing time of IntNo. is determined to exceed the maximum threshold in block 106, then it is considered to be overly active and a lower priority vector number is assigned to the associated interrupt in block 108. The newly assigned vector number of the associated interrupt is preferably a previously unassigned vector number.

If the cumulative processing time of IntNo. is determined not to exceed the maximum threshold in block 106, then block 108 is by-passed and execution continues at block 110 wherein the cumulative processing time of IntNo. is compared to a minimum processing time threshold (mintimethreshold). If the cumulative processing time of IntNo. is determined to be less than the minimum time threshold in block 110, then it is considered to be under active and a higher priority vector number is assigned to the associated interrupt in block 112. The newly assigned vector number of the associated interrupt is preferably a previously unassigned vector number. If the cumulative processing time of IntNo. is determined not to be less than the minimum threshold in block 110, then block 112 is by-passed and execution continues at block 114. Execution of block 114 may also occur after execution of block 104. In block 114, it is determined if IntNo. is set to the lowest vector number of the assigned interrupts. If so, the interrupt load balancing routine is considered complete and execution is returned to block 88 of the routine of FIG. 3. Otherwise, execution is directed to block 116 wherein the IntNo. is set equal to the next highest vector number of the assigned interrupts and the blocks 102 through 114 of the load balancing routine are re-executed for the new setting of IntNo.

In the foregoing described interrupt load rebalancing method, the cumulative processing times of the assigned interrupts were used for the determination of priority reassignment. If the cumulative processing time of an assigned interrupt falls within the window established by the maximum and minimum processing time thresholds, then it retains its priority vector number. Otherwise, if it falls outside the window thresholds, the priority vector number thereof is adjusted in a direction to improve the efficiency of interrupt servicing of the CPU. Also, an assigned interrupt may be reassigned or migrated to another CPU if the interrupt processing loading of the other or target CPU falls below a predetermined minimum threshold level.

In addition, while the cumulative processing time of each of the assigned interrupts is used in determining if reprioritization is desired, it is understood that this is merely a measurement of interrupt load on or hogging of the CPU and that other measurements could be used just as well without deviating from the broad principles of the present invention. For example, perhaps the frequency of processing an assigned interrupt could be used for determining its load on or hogging of the CPU in lieu of cumulative processing time. Other similar measurements of interrupt load and hogging could also be used for determining reprioritization.

Returning to the routine of FIG. 3, from block 86, execution continues at block 88 wherein it is determined if there are other interrupts pending in the IVR of the CPU. If so, the blocks of 66, 68, 82, 84, 86 and 88 are re-executed for the highest vector number of pending interrupts in the IVR. Note that once a pending interrupt has been serviced in block 68, it is no longer considered pending in the present embodiment. If there are no more pending interrupts in the IVR, the block 88 will exit the routine. Then, the routine may wait to be called again by block 64. Also, in the present embodiment, the loop of blocks 66, 68, 82 and 88 of the routine will continue to be executed in the interim between load balancing determinations, which may occur every fifteen (15) minutes or so, for example, to accumulate the load measurements of the active interrupts which are used to make the eventual determination. After balancing of the interrupt priorities a number of times, the interrupts should be at the proper priority levels to ensure that all of the assigned interrupts of the CPU will be serviced.

Figure 7:
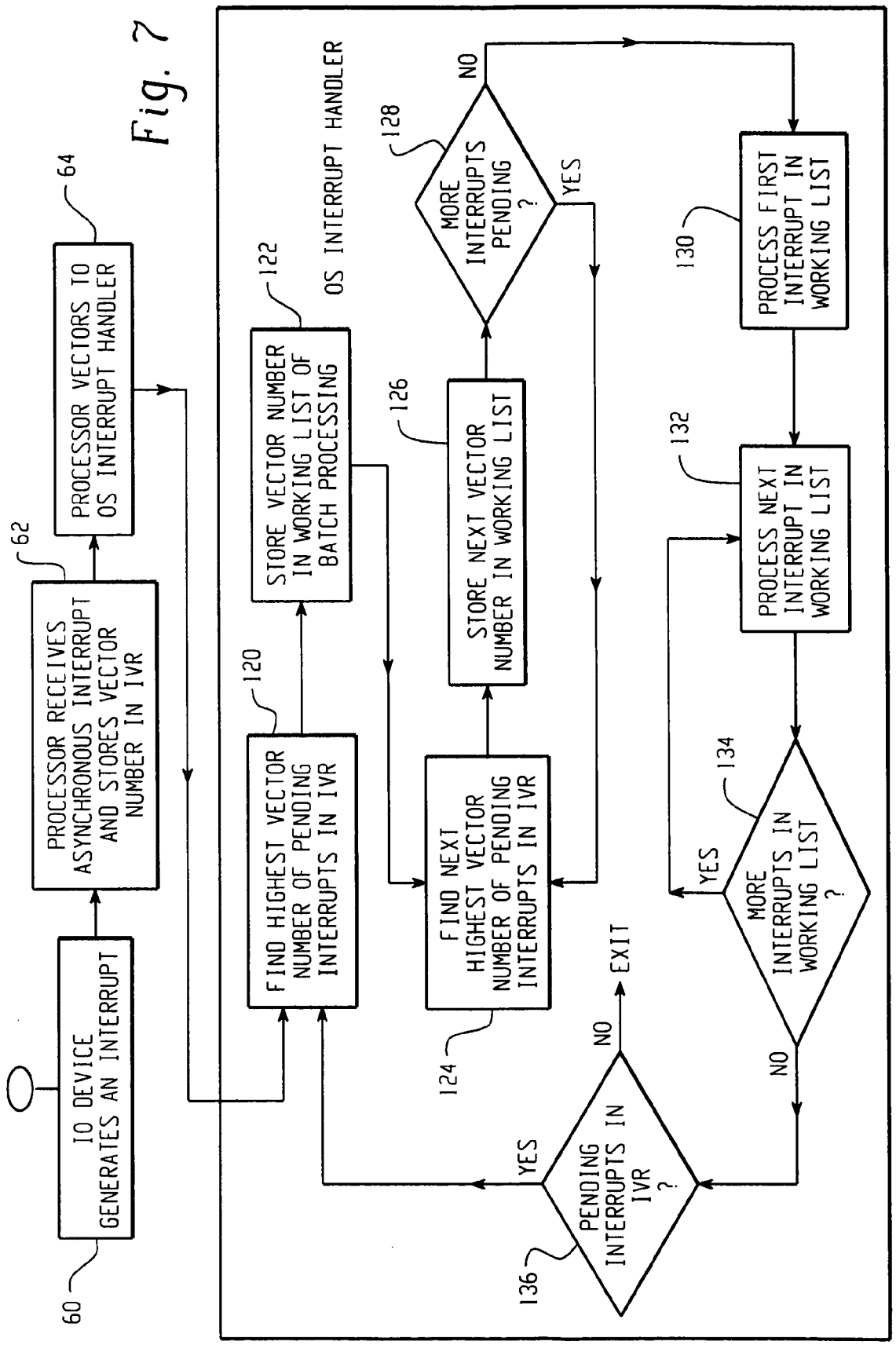
FIG. 7 is a flowchart exemplifying steps of an interrupt batch processing method.

In an alternate embodiment, the foregoing described routines may be used in conjunction with a batch processing of interrupts technique, such as the one described in the above-referenced U.S. Pat. No. 7,149,831. A brief description of the batch processing of interrupts method will be described in connection with the exemplary flowchart of FIG. 7. But, for a more detailed description thereof, reference is made to U.S. Pat. No. 7,149,831 which is incorporated herein by reference in its entirety. Referring to FIG. 7, the steps of 60, 62 and 64 will remain the same as described for the exemplary embodiment of FIG. 3. Upon calling the OS interrupt handler, block 120 is executed to find the highest vector number of pending interrupts in the IVR which is stored in a working list for batch processing. Then, in block 124, the next highest vector number of the pending interrupts in the IVR is found and stored in the working list by block 126. Blocks 124 and 126 are repeated until all of the current pending interrupts of the IVR are stored in the working list as determined by block 128. Note that the vector numbers of the working list are ordered according to priority, the highest being the first and the lowest being the last.

Thereafter, batch processing of the interrupts transferred to the working list are processed starting at block 130 wherein the first or highest priority interrupt is processed by the interrupt handler. Then, the other interrupts of the working register are processed according to the priority order by repeatedly executing block 132 until all of the interrupts have been serviced as determined by block 134. Thereafter, it is determined in block 136 if there are pending interrupts in the IR. If not, the routine exits and waits to be called again by block 64. If there are pending interrupts in the IVR, then the batch processing routine is repeated starting at block 120.

Note that if during execution of the batch processing routine an interrupt of a higher priority level than any of the interrupts in the current working list is received by block 62, execution of the batch processing routine is suspended and the higher priority level interrupt is serviced preemptively by the interrupt handler. Then, after servicing the preemptive interrupt, the interrupt handler may continue executing the batch processing routine as described above. Thus, generating the working list of all pending interrupts for batch processing does not prevent incoming higher priority level interrupts from monopolizing the OS interrupt handler. In order to ensure that the lower priority level interrupts are not "starved", it is desired that the OS interrupt handler occasionally rebalance the interrupt priorities. After a few rounds of reprioritizing, the priority levels of the interrupts should stabilize with little or no further rebalancing deemed beneficial.

Figure 8:
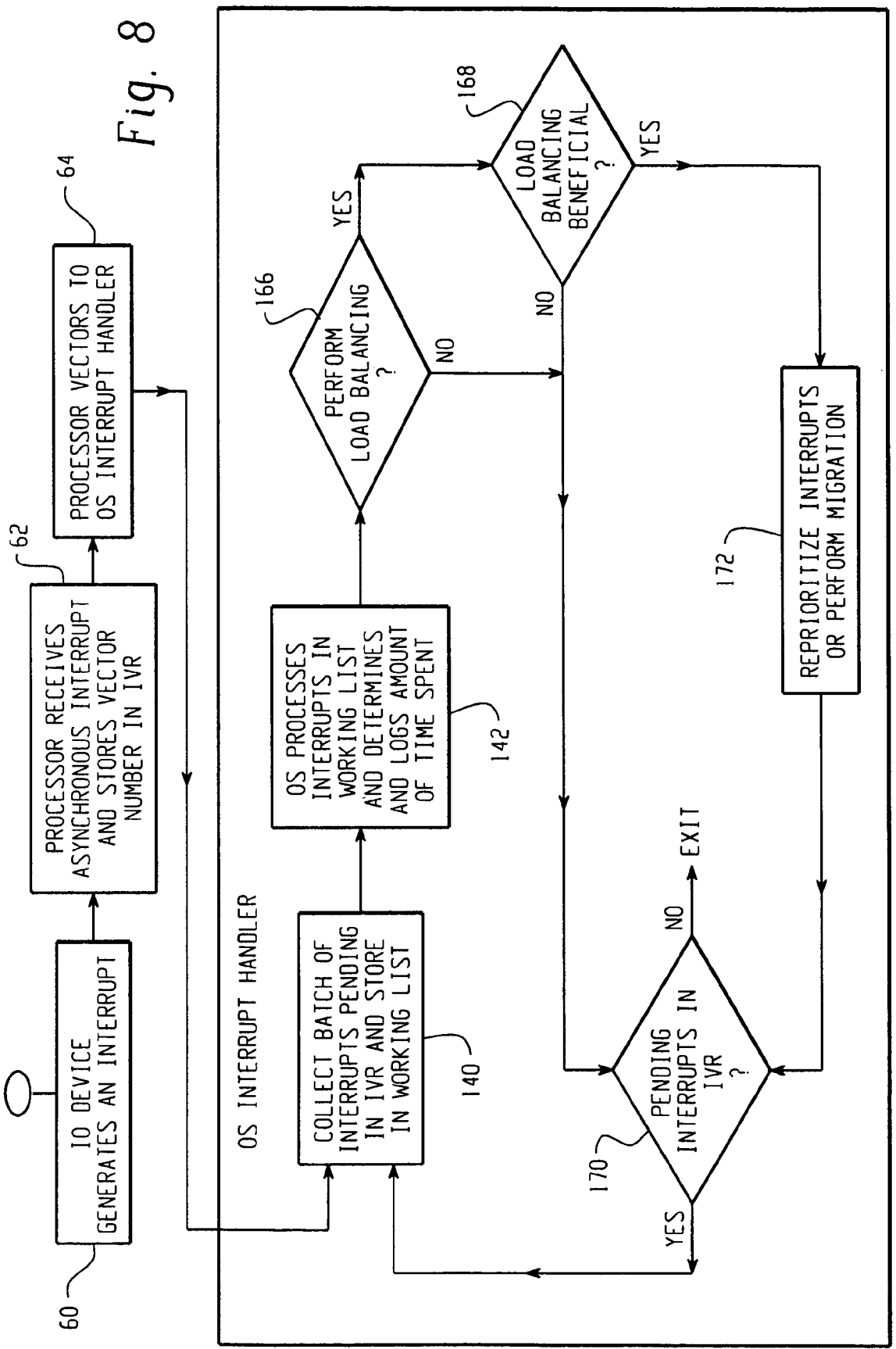
FIG. 8 is a flowchart exemplifying steps for performing interrupt service load balancing in an interrupt batch processing method.

A method of accomplishing this task is exemplified in the flowchart of FIG. 8. Referring to FIG. 8, the steps of 60, 62 and 64 will remain the same as described for the exemplary embodiment of FIG. 3. Upon calling the OS interrupt handler, a block 140 collects a batch of interrupts from the IVR and stores them in a working list similar to or much the same as described in connection with the exemplary flowchart of FIG. 7. In block 142 of the flowchart of FIG. 8, the OS interrupt handler batch processes the interrupts of the working list in a priority order, but in the present embodiment, the time spent for each interrupt is determined and logged into the table in a similar manner as described in connection with the exemplary flowchart of FIG. 4 except in this alternate embodiment, wait times of the interrupts may be determined and logged in addition to the processing times.

To determine the wait times of the interrupts of the working list, reference is made to the flowchart of FIG. 4 starting at block 150 which is a commencement of the interrupt collection steps of block 140. In block 152, just prior to reading the vector number of an interrupt from the IVR, a current time T1 in microseconds, for example, is accessed from the time clock. Then, the vector number of the instant interrupt is read from the IVR and stored in the working list by block 154 and the time T1 associated therewith is recorded, preferably in the table, in block 156. Blocks 152, 154 and 156 are repeated until there are no longer any current pending interrupts in the IVR as determined by block 158. That is, the pending interrupts have been read into the working list and their initial times T1 recorded.

The steps 70 through 80 of the flowchart of FIG. 4 will remain the same as described herein above for determining and recording the processing times for the processed interrupts of the working list. Additional blocks or steps 160-164 are included to also determine and record the waiting times of these interrupts. More specifically, in block 160, at commencement of servicing each interrupt of the working list, a difference in the associated times T2 and T1 is calculated as the individual waiting times of each. Next, in block 162, the individual waiting time of each interrupt is recorded in the table. In block 164, the individual waiting times of each interrupt are added together to yield a cumulative waiting time for each interrupt. The cumulative waiting times will be used, along with the cumulative processing times, in the load balancing determination routine of FIG. 5.

Returning to the flowchart of FIG. 8, block 166 determines whether or not it is time to perform the load balancing determination and may be carried out much the same as described for block 82 in connection with the flowchart of FIG. 3. If it is time, then block 168 will be executed; otherwise block 168 will be by-passed and block 170 will be executed. The exemplary flowchart of FIG. 5 may likewise be used for the steps of decisional block 168 except that to determine if load balancing is needed in this alternate embodiment, both waiting time and processing time for each interrupt may be taken into consideration. More specifically, in block 92' of the exemplary flowchart of FIG. 5, instead of just basing the decision on average processing time, an average waiting time may be also used in this decision.

For example, an average waiting time for each CPU may be calculated by adding up all of the cumulative waiting times stored in the table to yield a total processing time for the CPU which is divided by the number of interrupt vectors assigned to the CPU. Then, the average waiting time for each CPU may be compared with a CPU waiting time threshold in block 92' and the result of this decision may be logically "AND"ed or "OR"ed with the result of the CPU processing time comparison to determine whether to execute or by-pass block 172.

The steps of block 172 may be carried out in much the same manner as the described in connection with the exemplary flowchart of FIG. 6 for the reprioritization or migration of the interrupts except that in steps 106 and 110 cumulative waiting time may be used, along with cumulative processing time, for the reprioritization decision making thereof. For example, the cumulative waiting time for each interrupt may be compared with a maximum waiting time threshold in block 106 and the result of this decision may be logically "AND"ed or "OR"ed with the result of the corresponding maximum processing time comparison of block 106 to determine whether to execute or by-pass block 108. Likewise, the cumulative waiting time for each interrupt may be compared with a minimum waiting time threshold in block 110 and the result of this decision may be logically "AND"ed or "OR"ed with the result of the corresponding minimum processing time comparison of block 110 to determine whether to execute or by-pass block 112. The remaining steps of FIG. 6 will be carried out for block 172 in substantially the same manner as described herein above.

Once the tasks of block 172 have been performed, execution will continue at block 170 wherein it is determined if there are pending interrupts in the IVR. If so, execution will continue at block 140 for further batch processing of interrupts. Otherwise, execution will exit at block 170 and the routine will wait to be called again. Note that much of the batch processing of interrupts for the routine of FIG. 8 will occur in the loop of blocks 140, 142, 166 and 170. Every so often, like every fifteen (15) minutes, for example, or once sufficient load balancing information has been accumulated, the interrupts may be reprioritized and/or migrated to another CPU in block 172, and only if load balancing is deemed beneficial by block 168.

In the foregoing described embodiments, proper load balancing of external I/O device interrupts is achieved through modification of the interrupt priorities within a CPU and/or the migration of an interrupt to another CPU of the system. To determine when load balancing may be beneficial, the time spent processing each interrupt is determined and logged. This information accumulated over a period of time is used to determine what I/O device interrupts are most active and how much of the CPU's time is spent processing them.

If a CPU of the system services multiple I/O device interrupts which have been arbitrarily prioritized, the foregoing described embodiments may re-prioritize these interrupts to improve performance of the servicing thereof. For example, when the cumulative time spent processing an interrupt exceeds a predetermined threshold, servicing that interrupt may be considered monopolizing the CPU by not allowing other interrupts to be serviced efficiently. In response, action may be taken to reprioritize the assigned interrupts of the CPU. That is, a more active assigned interrupt may be given a lower priority, and vice versa, to permit the lower priority interrupts of the CPU to receive more immediate attention.

In the case where a plurality of interrupts of a CPU are determined to be heavily active, one or more of these interrupts may be migrated or re-assigned to a different CPU with lighter interrupt servicing activity. Once an interrupt has been migrated to another CPU, further load balancing in that CPU will occur as described herein above to achieve more efficient priorities among the CPUs of the system. The interrupt priorities and target CPU may be re-evaluated and adjusted periodically or every so often to meet the changing demands of the system or server.

The foregoing described embodiments take advantage of the built-in priority mechanisms of the OS interrupt handler of a system CPU, like the Itanium or Itanium 2 processor family, for example. Accordingly, each embodiment may reduce the amount of kernel code needed to prevent unfairness when servicing assigned interrupts. Each also takes advantage of parallel processing of the system CPUs by migrating or re-assigning interrupts between CPUs without requiring intervention from a system administrator. Determining and logging the waiting/processing times of the interrupts may be also used to identify problem areas in the interrupt service routines themselves.

While the present invention has been described in connection with one or more embodiments above, it is understood that these embodiments were merely presented by way of example. Accordingly, the present invention should not be limited to any single embodiment, but rather construed in breadth and broad scope in accordance with the recitation of claims appended hereto.

What is claimed is:

1. A method of balancing input/output (I/O) device interrupt service loading in a computer system, said method comprising:
   assigning priorities to a plurality of I/O device interrupts of a processing unit of the computer system;
   servicing said plurality of interrupts according to said assigned priorities;
   collecting data on said interrupt servicing of the plurality of interrupts over a time interval, wherein the collecting comprises measuring a processing time for servicing each respective one of the plurality of interrupts over the time interval;
   reassigning said priorities of the plurality of interrupts based on the measured processing times for the plurality of interrupts; and
   repeating said collecting and reassigning steps to balance input/output (I/O) device interrupt service loading of the processing unit.

2. The method of claim 1 wherein the step of collecting includes accumulating the measured processing times of each of the plurality of interrupts over the time interval to yield a cumulative processing time for each corresponding interrupt; and wherein the step of reassigning includes reassigning the priorities of said plurality of interrupts based on the cumulative processing times.

3. The method of claim 2 wherein the step of reassigning includes reassigning the priority of a particular one of the plurality of interrupts to a lower priority than an existing priority of the particular interrupt if the cumulative processing time of the particular interrupt exceeds a maximum time threshold.

4. The method of claim 3 wherein the particular interrupt is reassigned to the lower priority that was not previously assigned to any interrupt of the plurality of interrupts.

5. The method of claim 2 wherein the step of reassigning includes reassigning the priority of a particular one of the plurality of interrupts to a higher priority than an existing priority of the particular interrupt if the cumulative processing time of the particular interrupt falls below a minimum time threshold.

6. The method of claim 5 wherein the particular interrupt is reassigned to the higher priority that was not previously assigned to any interrupt of the plurality of interrupts.

7. The method of claim 1 including averaging the collected data on said interrupt servicing of the plurality of interrupts over the time interval; and wherein the step of reassigning is performed if the average of the collected data exceeds a predetermined threshold.

8. The method of claim 7 wherein the step of collecting includes accumulating the measured processing times of each of the plurality of interrupts over the time interval to yield a cumulative processing time for each corresponding interrupt; and wherein the step of averaging includes averaging the cumulative processing times to yield an average processing time for the processing unit.

9. The method of claim 1, wherein reassigning said priorities of the plurality of interrupts comprises changing a priority of a first one of the plurality of interrupts from a higher priority to a lower priority, and changing a priority of a second one of the plurality of interrupts from a lower priority to a higher priority.

10. The method of claim 1, further comprising:
    in addition to reassigning said priorities of the plurality of interrupts, re-assign a particular one of the plurality of interrupts from a first processor to a second processor to balance the input/output (I/O) device interrupt service loading of the processing unit.

11. A method of balancing input/output (I/O) device interrupt service loading in a computer system, said method comprising:
    assigning priorities to a plurality of I/O device interrupt vectors of a processing unit of the computer system;
    storing pending interrupt vectors in a register of the processing unit;
    reading said pending interrupt vectors into a working list;
    servicing said plurality of pending interrupt vectors from said working list according to said assigned priorities,
    collecting data on said interrupt vector servicing of the plurality of interrupt vectors over a time interval;
    reassigning said priorities of the plurality of interrupt vectors based on said collected interrupt vector service data; and
    repeating said collecting and reassigning steps to balance input/output (I/O) device interrupt service loading of the processing unit,
    wherein the step of collecting includes measuring a processing time for servicing each of the pending interrupt vectors over the time interval; and wherein the step of reassigning includes reassigning the priorities of said pending interrupt vectors based on the measured processing times.

12. The method of claim 11 wherein the step of collecting includes accumulating the measured processing times of each of the pending interrupt vectors over the time interval to yield a cumulative processing time for each corresponding interrupt vector; and wherein the step of reassigning includes reassigning the priorities of said pending interrupt vectors based on the cumulative processing times.

13. The method of claim 11 wherein the step of collecting further includes measuring a time that each interrupt vector in the working list has to wait before being serviced over the time interval; and wherein the step of reassigning includes reassigning the priorities of said pending interrupt vectors further based on the measured waiting times.

14. The method of claim 13 wherein the step of collecting includes accumulating the measured waiting times of each interrupt vector over the time interval to yield a cumulative waiting time for each interrupt vector; and wherein the step of reassigning includes reassigning the priorities of said interrupt vectors based on the cumulative waiting times.

15. The method of claim 14 including averaging the cumulative waiting times of the plurality of interrupt vectors over the time interval to yield an average waiting of the processing unit; and wherein the step of reassigning is performed if the average waiting time exceeds a predetermined threshold.

16. The method of claim 11, wherein reassigning said priorities of the plurality of interrupt vectors comprises changing a priority of a first one of the plurality of interrupt vectors from a higher priority to a lower priority, and changing a priority of a second one of the plurality of interrupt vectors from a lower priority to a higher priority.

17. A computer system comprising:
input/output (I/O) devices;
a processor; and
an interrupt handler executable on the processor to:
assign priorities to a plurality of interrupts from the I/O devices;
service said plurality of interrupts according to said assigned priorities;
collect data on said interrupt servicing of the plurality of interrupts over a time interval, wherein the collected data includes measured processing times for servicing respective ones of the plurality of interrupts;
reassign said priorities of the plurality of interrupts based on said measured processing times; and
repeat said collecting and reassigning tasks to balance I/O device interrupt service loading of the processor.

18. The computer system of claim 17, wherein collecting the data includes accumulating the measured processing times of each corresponding interrupt over the time interval to yield a cumulative processing time for each corresponding interrupt, and wherein said priorities of the plurality of interrupts are reassigned based on the cumulative processing times.

19. The computer system of claim 17, wherein said priorities of the plurality of interrupts are reassigned by changing a priority of a first one of the plurality of interrupts from a higher priority to a lower priority, and changing a priority of a second one of the plurality of interrupts from a lower priority to a higher priority.

* * * * *